United States Patent
Höche et al.

(10) Patent No.: US 10,704,620 B2
(45) Date of Patent: *Jul. 7, 2020

(54) METHOD FOR TRANSMITTING AND DAMPENING TORQUES

(71) Applicant: ZF FRIEDRICHSHAFEN AG, Friedrichshafen (DE)

(72) Inventors: Tobias Höche, Hofheim i. UFr. (DE); Tobias Dieckhoff, Würzburg (DE); Daniel Lorenz, Bad Kissingen (DE); Andreas Orlamünder, Schonungen (DE); Ingrid Hoffelner, Knetzgau (DE); Wolfgang Grosspietsch, Schweinfurt (DE); Steffen Matschas, Bad Bocklet-Aschach (DE); Johannes Friess, Michelau im Steigerwald (DE); Christofer Ebert, Schweinfurt (DE); Matthias Kram, Würzburg (DE); Dennis Egler, Espenau (DE); Axel Rohm, Schonungen (DE); Erwin Wack, Niederwerrn (DE); Bernd Unseld, Ravensburg (DE); Thomas Dögel, Nüdlingen (DE); Matthias Reisch, Ravensburg (DE); Lukas Spath, Schonungen (DE); Angelika Ebert, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/312,976

(22) PCT Filed: May 29, 2017

(86) PCT No.: PCT/EP2017/062834
§ 371 (c)(1),
(2) Date: Dec. 21, 2018

(87) PCT Pub. No.: WO2018/001660
PCT Pub. Date: Jan. 4, 2018

(65) Prior Publication Data
US 2019/0195298 A1 Jun. 27, 2019

(30) Foreign Application Priority Data

Jun. 30, 2016 (DE) .......................... 10 2016 211 956

(51) Int. Cl.
*F16D 48/06* (2006.01)
*F16D 48/08* (2006.01)

(52) U.S. Cl.
CPC ........ *F16D 48/08* (2013.01); *F16D 2500/104* (2013.01); *F16D 2500/30415* (2013.01);
(Continued)

(58) Field of Classification Search
CPC .... F16D 48/06; F16D 48/08; F16D 2500/104; F16D 2500/30415; F16D 2500/30426;
(Continued)

(56) References Cited

U.S. PATENT DOCUMENTS

2002/0062187 A1* 5/2002 Cimmino .............. B60W 10/06
701/56
2011/0237369 A1* 9/2011 Van Der Sluid ..........................
F16H 61/66272
474/70
(Continued)

FOREIGN PATENT DOCUMENTS

DE 195 49 259 3/1997
DE 196 12 455 10/1997
(Continued)

*Primary Examiner* — Edwin A Young
(74) *Attorney, Agent, or Firm* — Cozen O'Connor

(57) ABSTRACT

A method for transmission of and damping of a mean torque with a superposed alternating torque in a torque transmission
(Continued)

arrangement for a powertrain of a motor vehicle having an input and an output. The mean torque with the superposed alternating torque is transmitted along a torque path from the input the output. The input rotates at an input speed and the output rotates at an output speed. A slip arrangement is provided in the torque path between the input and the output for generating a speed slip. The slip arrangement provides a maximum of an external activation of the speed slip in the area of a maxima of at least one periodic oscillation component of an alternating component and provides a minimum of an external activation of the speed slip in the area of a minima of at least one periodic oscillation component of the alternating component (new).

11 Claims, 10 Drawing Sheets

(52) U.S. Cl.
CPC .............. *F16D 2500/30426* (2013.01); *F16D 2500/50293* (2013.01); *F16D 2500/7044* (2013.01); *F16D 2500/70426* (2013.01); *F16D 2500/70689* (2013.01)

(58) Field of Classification Search
CPC . F16D 2500/50293; F16D 2500/70426; F16D 2500/70689
See application file for complete search history.

(56) References Cited

U.S. PATENT DOCUMENTS

| | | | |
|---|---|---|---|
| 2012/0115678 A1* | 5/2012 | Doihara | F16H 61/66272 477/46 |
| 2019/0162255 A1* | 5/2019 | Hoche | F16D 48/08 |
| 2019/0219111 A1* | 7/2019 | Hoche | F16D 48/08 |

FOREIGN PATENT DOCUMENTS

| | | |
|---|---|---|
| DE | 10 2006 044 273 | 4/2008 |
| DE | 10 2008 009 135 | 8/2009 |
| DE | 10 2013 204 698 | 10/2013 |
| WO | WO 2015/070 851 | 5/2015 |

\* cited by examiner

Fig. 5
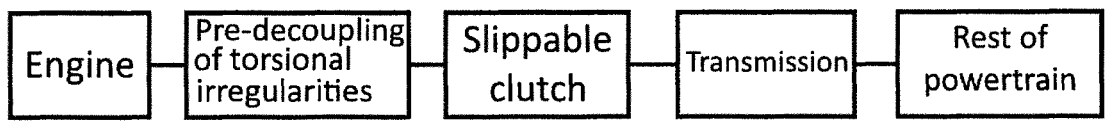
Fig. 6
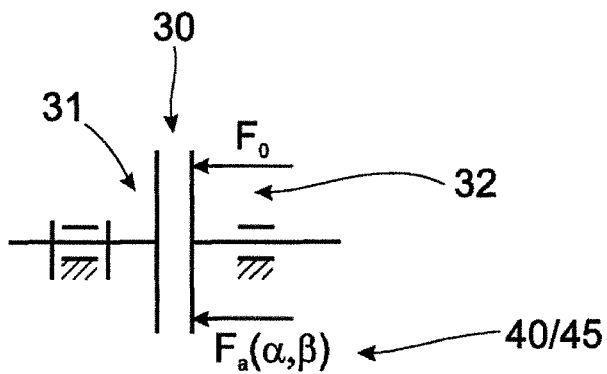
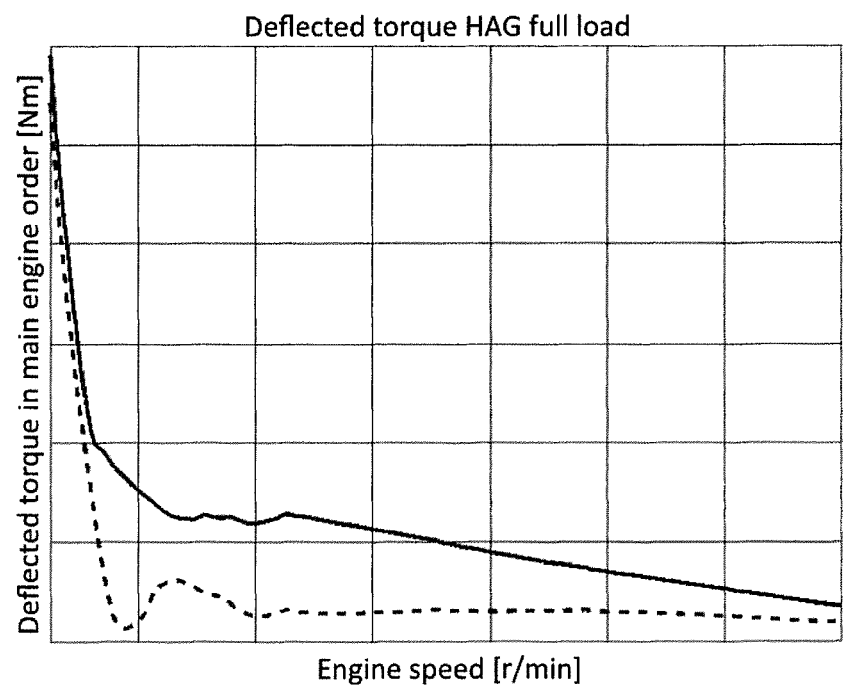
Fig. 7

Column 1　　　　　Column 2　　　　　Column 3

Line 1

Line 2

Line 3

US 10,704,620 B2

METHOD FOR TRANSMITTING AND DAMPENING TORQUES

CROSS REFERENCE TO RELATED APPLICATIONS

This is a U.S. national stage of application No. PCT/EP2017/062834, filed on May 29, 2017. Priority is claimed on German Application No.: DE2016211956.7, filed Jun. 30, 2016, the content of which is incorporated herein by reference.

BACKGROUND OF THE INVENTION

1. Field of the Invention

The present invention is directed to a method for the transmission of and for the damping of a mean torque with a superposed alternating torque in a torque transmission arrangement for a powertrain of a motor vehicle with an input area and a downstream output area.

2. Description of the Prior Art

A method of the above type in a torque transmission arrangement for the powertrain of a motor vehicle is known from the prior art in DE 10 2008 009 135 A1. In this method, a friction clutch is provided between an internal combustion engine and a shiftable transmission, and the friction clutch is controlled such that a speed difference of a resonance speed range present at the friction clutch is reduced during startup to a greater extent than when not controlled.

It is disadvantageous in this prior art method that only the starting process and the shuddering known through the starting process are to be reduced with this method. However, this method does not possess the capacity to damp torsional vibrations which are caused by the internal combustion engine and which occur in a constant driving state.

SUMMARY OF THE INVENTION

It is an object of one aspect of the present invention to provide a method for reducing torsional vibrations in a torque transmission device that effects an advantageous reduction in torsional vibrations chiefly after the starting process.

The invention is directed to a method for the transmission of and damping of a mean torque with a superposed alternating torque in a torque transmission arrangement for a powertrain of a motor vehicle comprising an input area, which is rotatable around a rotational axis (A), and an output area, which is rotatable around a rotational axis (B), wherein the mean torque with the superposed alternating torque is transmitted along a torque path from the input area to the output area, wherein the input area of the torque transmission arrangement rotates at an input speed around the rotational axis (A), and the output area of the torque transmission arrangement rotates at an output speed around the rotational axis (B), wherein at least the input speed is composed of a mean speed and a superposed alternating component, wherein the alternating component may be described approximately through a superposition of periodic speed oscillations whose frequencies have a substantially whole number ratio with the firing frequency, wherein each of these periodic oscillations has a minimum and a maximum, wherein a slip arrangement is provided in the torque path between the input area and the output area for transmitting the mean torque with the superposed alternating torque and for generating a speed slip between speed ne and speed na in the torque path, wherein the slip arrangement provides a maximum of an external activation of the speed slip in the area of the maxima of at least one periodic oscillation component of the alternating component and provides a minimum of an external activation of the speed slip in the area of the minima of at least one periodic oscillation component of the alternating component. Further torsional vibration damping units such as, for example, a first spring set and/or a second spring set and a damper unit can be arranged between the input area and the output area upstream of the slip arrangement. This is particularly advantageous because the alternating torques coming from the input area of an internal combustion engine, for example, are pre-filtered. The slip arrangement aims at reducing the remaining residual alternating torques, optimally even to zero. In order to achieve this, the method according to the invention provides that more slip is permitted in case a maximum external activation of the slip arrangement is carried out in the area of a maximum of a periodic oscillation of the superposed alternating torque and that less slip is permitted in case a minimum external activation of the slip arrangement is carried out in the area of a minimum of a periodic oscillation of the superposed alternating torque. This means that the slip arrangement that can be formed, for example, by a slip clutch or a multiple disk clutch, obtains a hydraulic signal from the external activation in the form of a lower hydraulic pressure, which can result in a reduced pressing force on the multiple disk clutch and can accordingly lead to increased slip, that is, an increase in the speed difference. In the case of slip reduction, the external activation should send a hydraulic signal to the slip clutch in such a way that, in this case, a hydraulic pressure is increased and the pressing force on the slip clutch is accordingly likewise increased, which leads to a reduction in slip in the slip clutch. The maximum in the superposed alternating torque can be counteracted in this way. The external activation for achieving the slip reduction and slip increase may also be referred to as slip modulation. In this regard, the frequency of the slip modulation depends on the use of drive unit, for example, the internal combustion engine. When using a four-stroke internal combustion engine, a frequency range of from 23 Hertz to 60 Hertz is advantageous. When using a four-cylinder/stroke engine, the use of a frequency range from about 33 Hertz to 66 Hertz is advantageous. When using a six-cylinder four-stroke internal combustion engine, the use of a frequency range from 50 Hertz to 100 Hertz is advantageous.

It may be advantageous that the external activation of the slip arrangement is carried out by a hydraulic unit. Since the control of clutches in the torque transmission arrangement is mainly carried out hydraulically, the external activation of the slip arrangement can likewise be carried out via the hydraulic unit which is usually already provided.

The hydraulic unit can also provide at least one hydraulic pump, a hydraulic high-pressure storage and a pressure control valve.

The pressure control valve can be spatially associated with the high-pressure storage. This variant may be advantageous if, for example, the high-pressure storage is provided externally, for example, outside of the torque transmission arrangement or, for example, if there is little installation space available in the area of the slip arrangement.

It may also be advantageous if the pressure control valve is spatially associated with the slip arrangement. This embodiment form is especially advantageous because possible pump losses that can occur in a hydraulic line can be reduced.

It may be further advantageous when the external activation is suitable to provide a modulation range of from 23 Hz to 50 Hz or a range of from 33 Hz to 66 Hz or a range of from 50 Hz to 100 Hz at the slip arrangement.

Further, the slip arrangement can be used as a starting element. In this regard, the slip arrangement is configured such that a mean torque generated by the drive unit can be conveyed to the transmission so as to be reliably transmitted. When the slip arrangement is used as a starting element, the slip arrangement is to be constructed such that larger speed differences can also be synchronized with the slip arrangement. This embodiment form is particularly advantageous because there is no need for an additional starting element, and component parts and, therefore, costs and installation space can accordingly be saved. The control of the slip arrangement as starting element can also be carried out via the external activation.

It can also be advantageous when a starting element is provided in addition to the slip arrangement. This constructional variant is particularly advantageous because the slip arrangement can be designed selectively to reduce alternating torques. The additional starting element in the form of known starting clutches, for example, a dry single-disk or dual-disk clutch, a wet multiple disk clutch or a hydrodynamic multiple disk clutch or an inner starting element in an automatic planetary gear unit takes over the starting process.

The slip arrangement and/or the starting element can be constructed as a friction clutch or as a multiple disk clutch or as a hydrodynamic clutch or as a disconnect clutch in hybrid drives or as a dual clutch or as a triple clutch or as a brake in conjunction with a planetary gear unit.

Further, rotational axis (A) and rotational axis (B) can extend coaxially or so as to be offset relative to one another. For example, if the input area and the output area lie on the same rotational axis, for example, in a front engine with rear-wheel drive, the rotational axes extend coaxial to one another. On the other hand, in a front-wheel drive with transversely mounted engine, the rotational axis of the input area often extends at an offset with respect to the rotational axis of the output area.

BRIEF DESCRIPTION OF THE DRAWINGS

The invention will be described in more detail in the following referring to diagrams. The embodiment examples shown in the drawings merely represent preferred constructions and do not limit the scope of the invention. The scope of the invention is defined uniquely by the appended claims.

The drawings show:

FIG. 5 is a preferred topology in a schematic view;

FIG. 6 is a basic wiring diagram of a slip clutch;

FIG. 7 is a deflected torque diagram;

DETAILED DESCRIPTION OF THE PRESENTLY PREFERRED EMBODIMENTS

Figure 1:
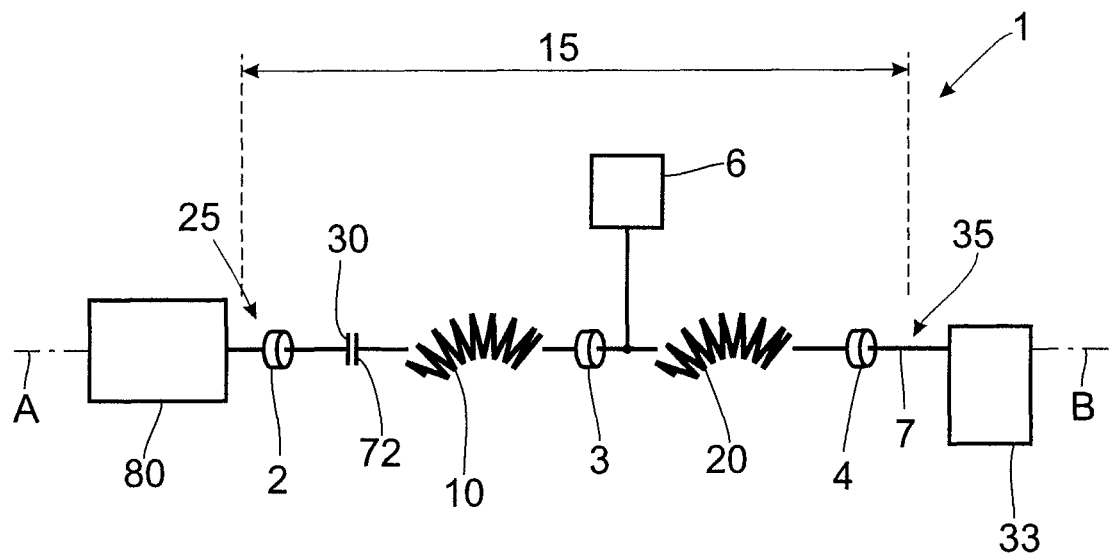
FIG. 1 is a schematic view of a powertrain as prior art.

Like or identically functioning component parts are designated by like reference numerals in the following.

Before commenting on FIG. 1, it should be noted that present-day torsional vibration decoupling systems for passenger automobiles also provide speed-adaptive dampers in addition to spring-mass arrangements, for example, a dual mass flywheel. In addition, a reduction in torque fluctuations in the internal combustion engine can be and is carried out, at least in powertrains with wet starting elements, via slip in the starting element. The technique utilized for this purpose in which a slip controller adjusts a predetermined mean slip speed is referred to in the following as "active slip mode 1". A method is presented in the following for controlling a clutch in a passenger vehicle powertrain which is designated "active slip mode 2" and which in particular shall make it possible to achieve an appreciably better decoupling at the same mean slip speed and, therefore, with the same friction losses than a slipping clutch according to the prior art or at least to achieve a level of decoupling equivalent to conventional systems while using lighter and less expensive components for pre-decoupling, for example, spring sets and mass dampers.

FIG. 1 shows a torque transmission arrangement 1 in an automatic powertrain of a motor vehicle according to the prior art containing a torsional vibration damping unit 15 with speed-adaptive damper 6. The relevant masses, stiffnesses and the starting element are arranged as follows, the depiction extending only through the transmission. The rest of the powertrain is not visible. A converter lockup clutch 72 is arranged at the input area 25 of the torsional vibration damping unit 15.

The speed-adaptive damper 6 is positioned at an intermediate mass 3 between a first spring set 10 and a second spring set 20. This topology has the following disadvantages with respect to decoupling of torsional vibration. If the converter lockup clutch 72 is operated with a clutch slip, this reduces the torque fluctuations that are conducted into the torque transmission arrangement 1. Owing to the fact that the speed of the components on the output side of the converter lockup clutch 72, and therefore also the speed of the mass damper 6, is lower by the adjusted slip speed than, for example, an engine speed of the drive unit 80, the tuning of the mass damper 6 to the engine order is no longer correct so that the mass damper 6 operates progressively worse as slip increases. The second spring set 20 provides a spring stiffness between the relatively high mass inertia of the mass damper 6 and the likewise relatively heavy transmission 33. If the mass damper 6 were linked directly to a transmission input shaft 100 then, given the moments of inertia and shaft stiffnesses that are usually present, the result would be vibrational nodes, as they are called. This means that at certain speeds, also depending on gear, the mass damper in the vibration system does not undergo any excitation and accordingly cannot establish any reaction torque and, consequently, cannot contribute to decoupling of rotational irregularities. At the corresponding speed, this manifests itself through an appreciable increase in the residual rotational irregularity (see the dashed line in the top speed area shown in FIG. 3). While this is prevented with the existing topology, an intermediate mass resonance which is unfavorable with respect to decoupling of rotational irregularities can develop through the relatively high mass moment of inertia of the intermediate mass 3 and mass damper 6 in interplay with the stiffnesses of the spring sets 10 and 20.

Figure 2:
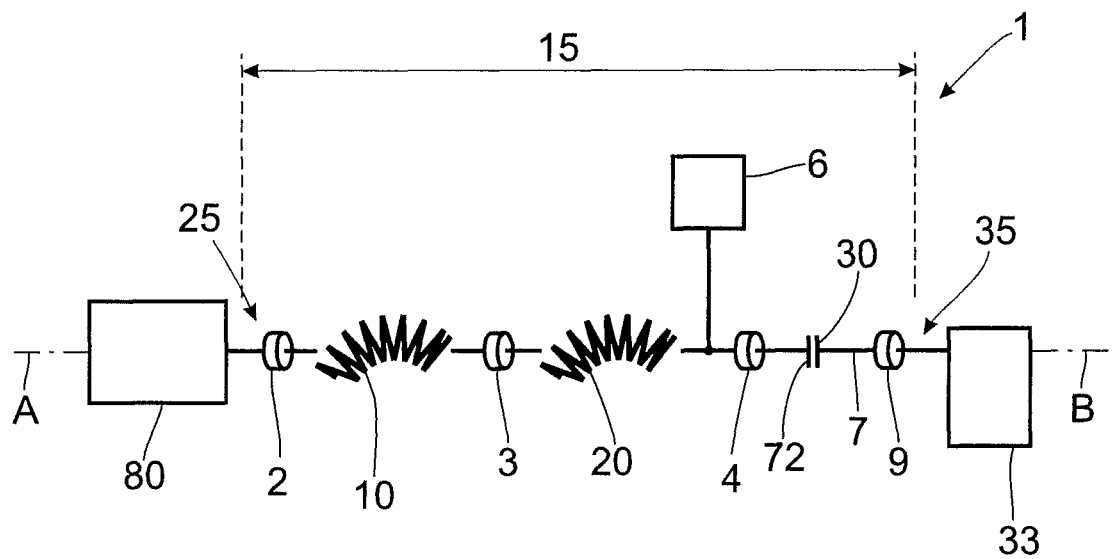
FIG. 2 is an advantageous schematic view of a powertrain.

FIG. 2 shows a more advantageous topology of the components which were shown in FIG. 1. This topology is characterized in that the second spring set 20 is arranged on the primary side with respect to the mass damper 6 resulting in the following advantages. For one, a pre-decoupling upstream of the mass damper 6 is improved by a reduction in the combined stiffness of the two series-connected spring sets 10 and 20 such that the mass damper 6 can be constructed more compactly and the system can operate supercritically already at low speeds as is clearly shown by the dash-dot line in FIG. 3. Further, the intermediate mass 3 is appreciably smaller without the link to the mass damper 6 so that no interfering intermediate mass resonance occurs in the operating range. Further, the converter lockup clutch 72 is arranged on the output side of the torque transmission arrangement 1 between the mass damper 6 and the transmission 33. This is advantageous because the order tuning of the mass damper 6 is not impaired by the clutch slip. The formation of the above-described vibrational nodes is also mitigated or prevented through the clutch slip of the converter lockup clutch 72 as is shown by the dotted line in FIG. 3.

To facilitate comparison, the arrangement shown in FIG. 2 uses basically the same schematic construction and the same quantity of subassemblies, in particular spring sets, as FIG. 1.

However, it will be appreciated that this is only exemplary. Functionally, other constructions of the torsional damper 10, 20, for example, are also possible, inter alia as single-row or multiple-row dual mass flywheel. The mass damper 6 can also be constructed in different ways, particularly advantageously as a Sarrazin type, Salomon type, or DFTvar type speed-adaptive mass damper.

Figure 3:
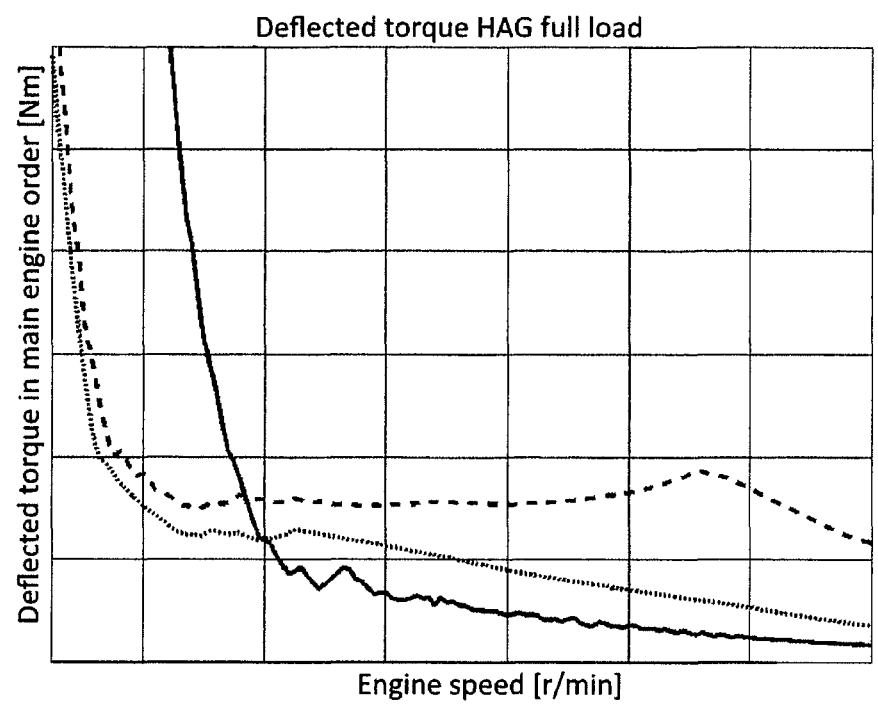
FIG. 3 is a deflected torque diagram.

FIG. 3 shows the deflected torque over speed of a prior art torque transmission system, one variant without slip and one variant with slip mode 2.

Figure 4:
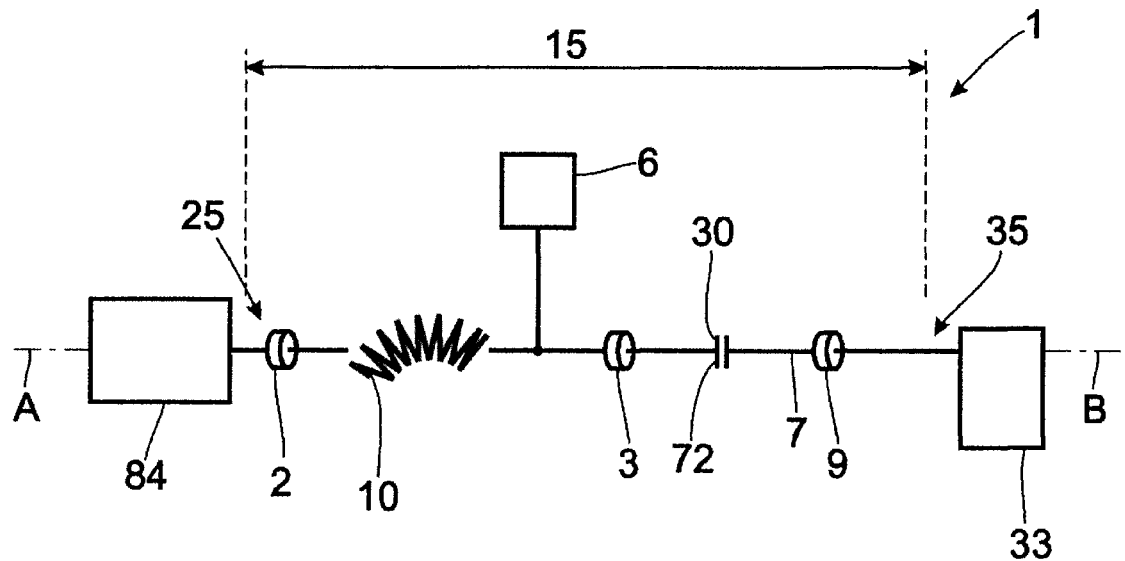
FIG. 4 is an advantageous schematic view of a powertrain.

FIG. 4 shows a further topology arrangement as has already been described in FIGS. 1 and 2, but with only one spring set 10, in this case as a dual mass flywheel with a one-row spring set.

FIG. 5 shows an advantageous topology for torsional vibration reduction in the powertrain. Pre-decoupling of rotational irregularities refers here to a system which reduces the rotational irregularity upstream of the slippable clutch 30. As in the concrete example given above, this can comprise an arrangement of torsion springs, masses and mass dampers. However, other principles are also possible such as, for example, a rotational irregularity decoupling with two parallel torque transmission paths and a coupling arrangement, a gas spring torsional damper, or an arrangement of centrifugal springs.

The required slippable clutch 30 can also be a starting clutch simultaneously. However, this is not absolutely necessary. The starting clutch can otherwise be placed at any other position in the powertrain. However, the slippable clutch can just as easily be one or more clutches of the transmission which, depending on gear, perform tasks in gear shifting and/or decoupling of rotational irregularities by slipping. The type of transmission, for example, automatic transmission (AT), dual clutch transmission (DCT), automated manual transmission (AMT), shiftless transmission, or manual transmission (MT) and the construction of the powertrain as front-wheel, rear-wheel or all-wheel drive, also in hybrid construction, are optional. Particularly in MT and DCT transmissions the described topology is already standard, but not in combination with AT transmissions. However, particularly in manual transmissions but also in dry dual clutch transmissions the starting clutch used is not suitable over the long term for performing a function for rotational irregularity decoupling through slip. To this extent also, the suggested construction is novel for these powertrains.

FIG. 6 shows a simplified schematic diagram of a slippable clutch 30 according to an improved method, namely, clutch slip mode 2.

A substantially improved decoupling can be achieved even at low speed with the above-described topology with identical stiffness values of the spring set 10, 20, and even clutch slip mode 1 acts effectively to further improve decoupling or to prevent vibrational nodes. However, the clutch slip generally leads to friction losses which can take on unacceptable values at high engine torque and high slip speed. Increasing fuel consumption and, therefore, $CO_2$ exhaust and the generated friction heat which must be dissipated have a limiting effect in this case.

One aspect of the present invention is to enhance the decoupling effect of slip at low slip speed. This is achieved in that the torque which is transmittable by the clutch is actively modulated. For this reason, this process is called active slip mode 2. A force that is adjusted by a slip controller in order to achieve a determined mean speed difference between an input side 31 of the slip arrangement 30 and an output side 32 of the slip arrangement 30 is designated by F0. At a stationary operating point, F0 may be considered constant. To this extent, the transmittable torque of the clutch 30 is calculated as:

$$M\_tr = F\_0 \cdot r \cdot \mu(n\_slip),$$

where
r=mean friction radius
μ=friction coefficient of clutch linings which depends on the slip speed n_slip.

Fa(α) designates an additional force whose amplitude depends on a reference angle α and a phase shift β. The dependency can be given by a sine function, for example. The reference angle can be, for example, the crankshaft position. For tuning to the main engine order in a four-cylinder four-stroke engine, this would mean:

$$F\_a(\alpha, \beta) = F\_a \cdot \sin(2a + \beta)$$

Accordingly, the transmittable torque is calculated as:

$$M\_tr = [[F]]\_0 + F\_a \cdot \sin(2a + \beta)] \cdot r \cdot \mu(n\_slip).$$

FIG. 7 shows the effect of the modulation of the clutch torque on the torsional vibration decoupling of the main engine order. Compared to slip mode 1, the rotational irregularity is once again substantially reduced by slip mode 2 at the same mean slip speed and with correspondingly identical friction losses.

Figure 8:
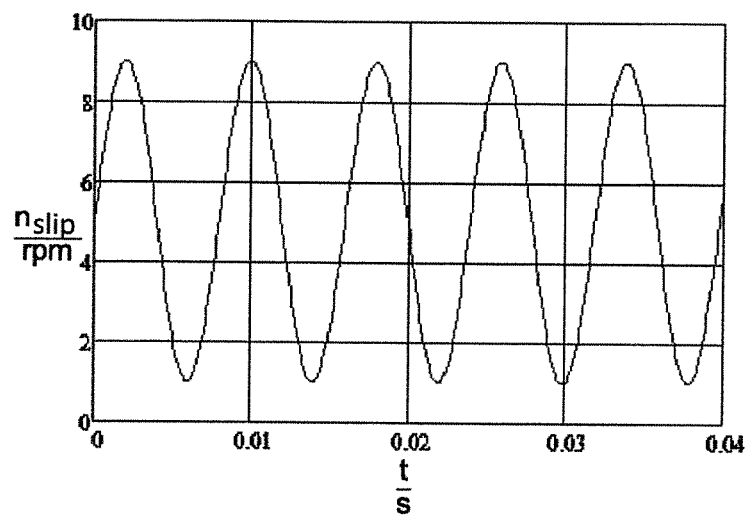
FIG. 8 is a slip speed plotted over time.
Figure 9:
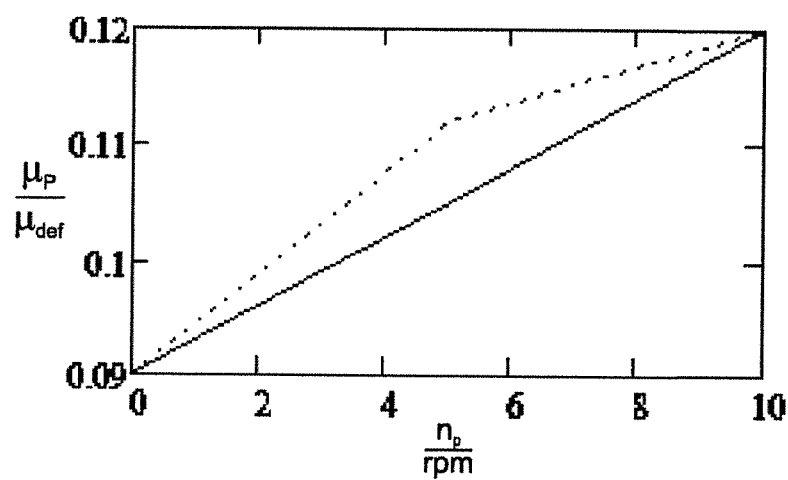
FIG. 9 is a friction coefficient plotted over slip speed.
Figure 10:
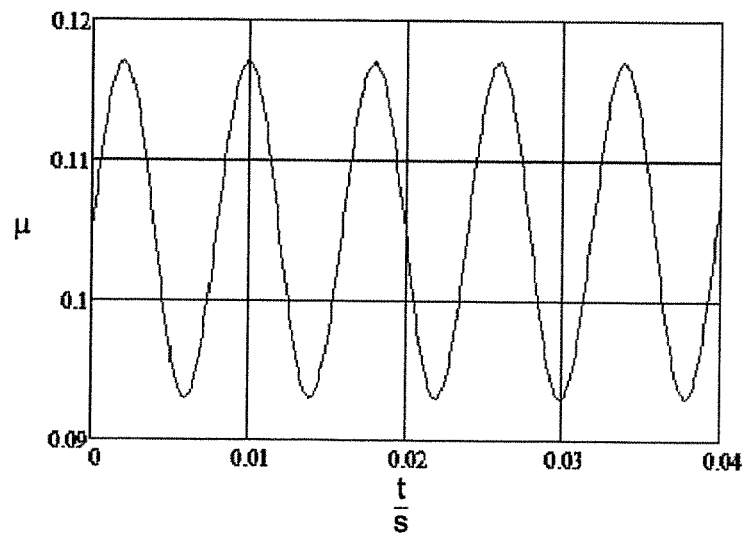
FIG. 10 is a friction coefficient plotted over time.

FIGS. 8, 9 and 10 illustrate how the functioning of active slip mode 2 is derived. Because of nonlinear relationships and non-harmonic excitation in the actual powertrain, the way the modulation of the transmittable clutch torque works in relation to the decoupling of rotational irregularities can only be graphically derived under highly simplified conditions. To this end, let it be assumed that a rotational irregularity at the input side of the clutch is purely sinusoidal in the main order, in this case the first engine order. At a constant clutch force F0, there is in this example a mean slip of 5 RPM that oscillates around the mean value with an amplitude of 4 RPM (compare FIG. 8). The curve of the friction coefficient of the slip clutch over slip is linearized in this area, which is represented by the solid line in FIG. 9. Accordingly, a sinusoidal curve over time also results for the friction coefficient as is shown in FIG. 10. The mean friction coefficient in this case is $\mu\_0=0.105$ and the amplitude is $\mu\_a=0.012$.

For the transmittable torque with modulation in the main order, in turn:

$$M\_tr = [\![F]\!]\_0 + F\_a \cdot \sin(a+\beta)] \cdot r \cdot [\mu\_0 + \mu\_a \cdot \sin(\alpha)].$$

Angle $\alpha$ is calculated as $\alpha=2\cdot\pi\cdot n\cdot t$, where n=speed and t=time.
With an optimal phase shift $\beta=180°=\pi$, it follows: $\sin(\alpha+\pi)=\sin(\alpha)$.
Through expansion of M_tr:

$$M\_tr = r \cdot [F\_0\mu\_0 + (F\_0\mu a - F\_a\mu\_0)\sin(\alpha) - F\_a\mu\_a \sin{}^2[\![(\alpha)]\!]].$$

With $\sin{}^2[\![(\alpha)]\!] = \frac{1}{2}(1-\cos(2\alpha))$, it follows:

$$M\_tr = r \cdot [\![(F]\!]\_0\mu\_0 - (F\_a\mu\_a)/2) + (F\_0\mu\_a - F\_a\mu\_0)\sin(\alpha) + (F\_a\mu\_a)/2 \cos(2\alpha)]$$

The summands in the square brackets of this term can be assigned to different orders:

$$F\_0\mu\_0 - (F\_a\mu\_a)/2 \qquad \text{Zeroth order:}$$

Mean torque
To obtain the same mean transmittable torque, different forces F_0 are necessary (adjusted by
the slip controller) for different subtrahends (F_a $\mu$_a)/2.

$$(F\_0\mu\_a - F\_a\mu\_0)\sin(\alpha) \qquad \text{First order:}$$

Main order in this example
Can be completely canceled under the simplified assumptions in the choice of F_a=(F_0$\mu$_a)/$\mu$_0. The effect of the invention is grounded in this.

$$(F\_a\mu\_a)/2 \cos(2\alpha) \qquad \text{Second order:}$$

The modulation results in a new order with doubled modulation frequency. However, the amplitude of this order is comparatively small and, in addition, higher orders of the powertrain are damped better than lower orders so that the positive effect of reducing the main order is preponderant. This derivation is a highly simplified model. Because conditions diverge from real-world conditions, a complete cancellation of the main engine order is impossible in practice with this method, but an appreciable reduction is possible as can be seen from FIG. 7.

The function of the clutch slip with active modulation, i.e., clutch slip mode 2, is determined by the following parameters.

Figure 11:
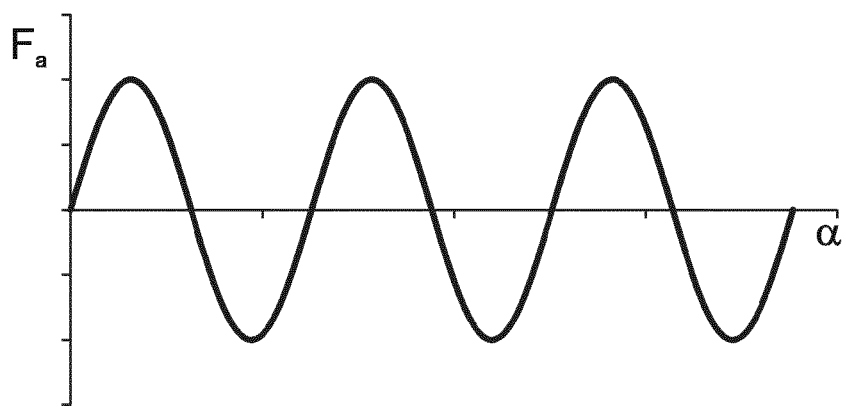
FIG. 11 is a diagram of sine wave of Fa.
Figure 12:
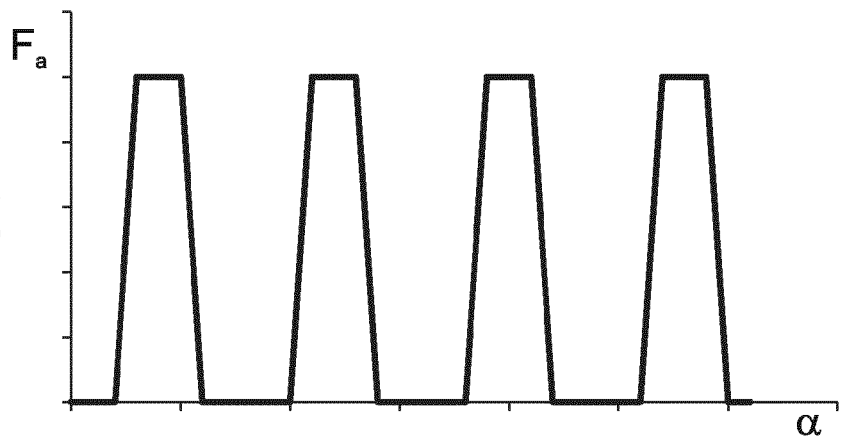
FIG. 12 is a diagram of trapezoidal wave of Fa.
Figure 13:
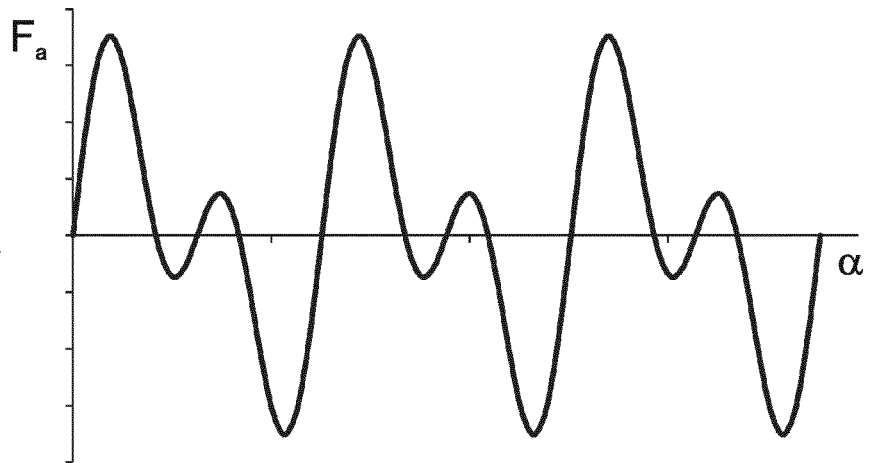
FIG. 13 is a diagram of sine wave of Fa of higher order.

One parameter is the vibration mode. The optimal curve of the transmittable clutch torque over time depends on the curve of the rotational irregularity of the main order at the clutch input. In the preceding example, the assumed excitation was purely sinusoidal as was the optimal curve of the modulated clutch force. In an actual powertrain, the main order of the alternating torque at the clutch input which has already been pre-decoupled has an at least approximately sinusoidal shape so that the modulation of the clutch torque can also be described by a sine function in this case in order to achieve good results as is shown in FIG. 11. However, other harmonic and non-harmonic functions can also be taken as a basis such as, for example, a trapezoidal curve as is shown in FIG. 12. The vibration mode can also be optimized to reduce a plurality of engine orders. In a simple case, this is possible in that the modulation is described by a superposition of two sine oscillations, where one sine oscillation has the firing frequency, for example, and the other has the doubled firing frequency.

However, dividing the actuating force of the clutch into a force F0, which is predefined via the slip controller and constant at the stationary operating point, and a dynamic force Fa for modulation of the transmittable torque is mainly a conceptual model for describing the working principle of the invention. It is a matter of design implementation whether two forces are actually superimposed, e.g., in the sense of two separate actuators, whether the force which an individual actuator applies to the clutch is varied in a corresponding manner, or whether combination forms are used.

What is decisive for the method is only that the transmittable torque of the clutch are changed dynamically in a suitable form and with suitable parameters. For tuning to the main engine order, the modulation frequency must correspond to the firing frequency of the internal combustion engine. Therefore, it increases as a function of engine speed. In a 3-cylinder 4-stroke engine, for example, for the speed range from 1000 RPM to 2000 RPM, a modulation frequency of 25 Hz to 50 Hz is necessary. In engines with cylinder deactivation, it is particularly advantageous when the adjustment of slip actuation allows switching between the orders of the full range and the deactivation range. Configuring to higher orders or a combined configuration to a plurality of orders is also possible.

The optimal phase of the modulation amounts to 180° in relation to the vibration of the input speed of the slip arrangement as has already been described above in the theoretical derivation of the function. Phase shifts in the range of 180°±45° are particularly advantageous. If the phase shift is too small, the rotational irregularity is magnified and reaches a maximum at phase equality.

Figure 14:
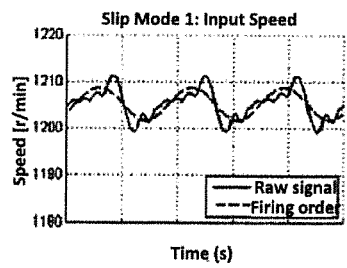
FIG. 14 is a further diagrams.
Figure 14:
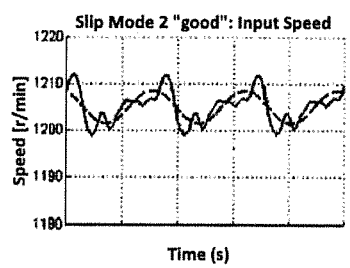
Figure 14:
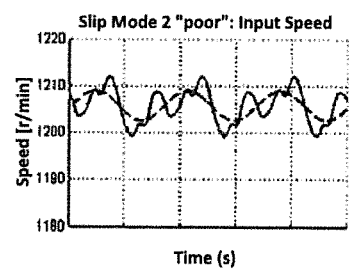
Figure 14:
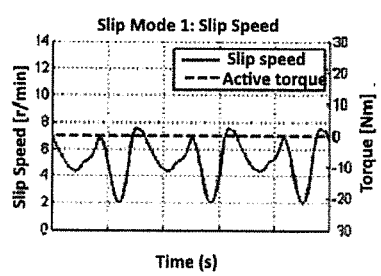
Figure 14:
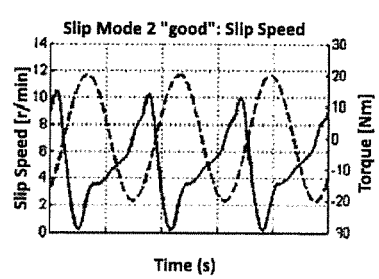
Figure 14:
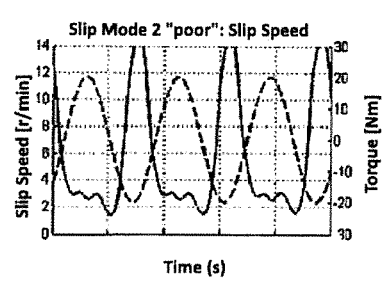
Figure 14:
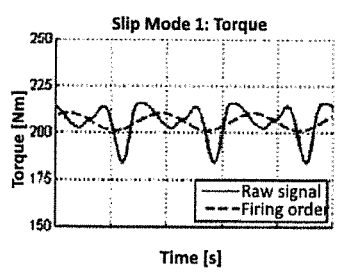
Figure 14:
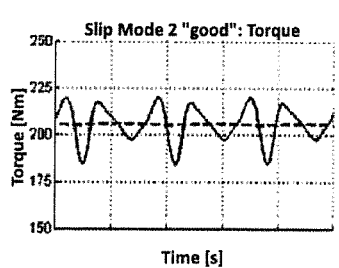
Figure 14:
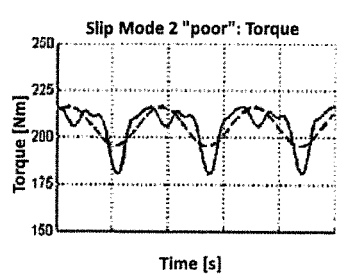

FIG. 14 shows different values in the powertrain of a motor vehicle according to FIG. 4 for three different cases:
Column 1: slip mode 1
Column 2: slip mode 2—phase in a favorable range
Column 3: slip mode 2—phase in an unfavorable range.

The speed at the input area 31 of the slip clutch 30 is shown in each instance in the top line. Owing to the rotational irregularity of the internal combustion engine, the speed fluctuates around a mean speed, in this case ~1205 RPM, in spite of pre-decoupling, e.g., through a DMF and a speed-adaptive damper 6 (compare this arrangement with the constructions in FIGS. 5 and 6). For the sake of clarity, the oscillation of the speed in an engine firing order is also shown in addition to the raw signal. This can be determined by means of fast Fourier transformation from the time curve of the total vibration.

The slip speed ns between the input side 31 and output side 32 of the slip clutch 30 and the active torque Ma are shown in the second line. The active torque Ma is directly proportional to the above-mentioned active force component Fa and is calculated as: $M\_a = F\_a \cdot r \cdot \mu$.

In the active slip mode 1 in column 1, force Fa and therefore also torque Ma are equal to zero. Accordingly, the occurring slip curve is the result of the actuating force F0 adjusted by the slip controller to obtain a mean slip (in this case 5 l/min), the curve of excitation, i.e., the speed fluctuation or torque fluctuation at the clutch, and the curve of the friction coefficient of the clutch over slip speed.

In active slip mode 2, a sine curve of force component Fa and of active torque Ma with a determined amplitude and with the firing frequency of the internal combustion engine is given in columns 2 and 3.

In column 2, the phase relation of the curve of the active torque Ma to the curve of the speed upstream of the clutch in firing order in the diagram amounts to approximately 180°. In other words, in the time domains in which the speed fluctuation in firing order has minima, the active torque Ma has maxima, and vice versa. This shows an optimized tuning of active slip mode 2.

An unfavorable case in which the active torque runs approximately in phase with the speed at the input area of the clutch is shown in column 3.

The diagrams in line 3 again show the torque transmitted by the clutch as original raw signal and as the component thereof in engine firing order. It will be appreciated that the irregularity in the torque in the main engine order is almost completely rectified with active slip mode 2 with optimized phase (see column 2). With the unfavorable phase (see column 3), the amplitude of the torque irregularity is increased even further relative to active slip mode 1 (see column 1).

However, the phase of the modulation need not be exactly 180° in relation to the speed at the input of the slip mechanism to achieve a positive effect. In order to achieve an improvement over active slip mode 1, it is advantageous when the phase shift is in the range of 180°±45°.

Figure 15:
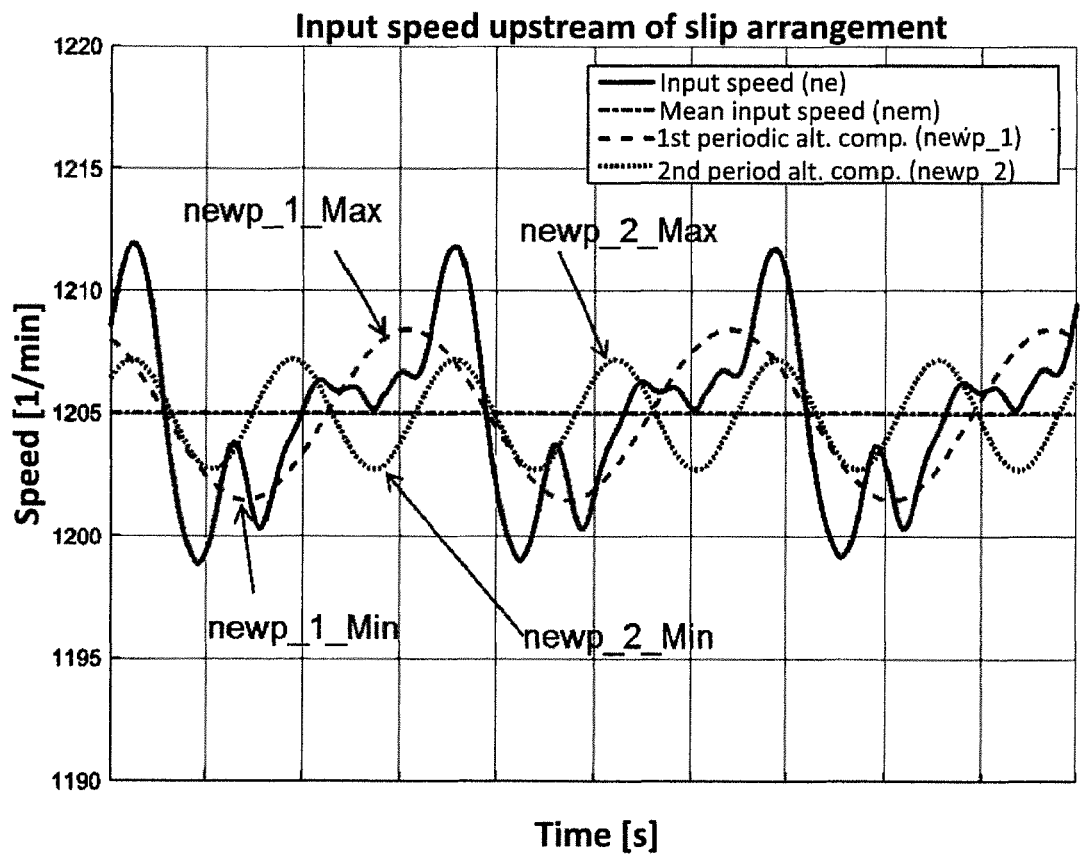
FIG. 15 is a diagram of input speed at the slip arrangement at an operating point.

FIG. 15 shows the speed curve in the input area 31 of the slip arrangement 30 as is also shown in FIG. 14, middle column, top line, for a static operating point.

The input speed (ne) has a mean value (nem), in this case 1205 l/min, around which an alternating component (new), not shown here, oscillates because it is congruent with the curve of ne. The curve of the alternating component substantially depends upon the character of the drive unit 80, in particular the quantity of cylinders, and the pre-decoupling. The alternating component can be described by means of fast Fourier transforms (FFT) approximately as superposed sinusoidal oscillations (newp_i). The lowest frequency of a periodic partial oscillation of the alternating component of this kind is the firing frequency of the engine. The frequencies of further harmonic oscillations have a whole number ratio with the firing order. In an actual powertrain, vibration components can also occur with a non-whole number relationship with the firing frequency, but this will not be dealt with here. The periodic alternating components in the main engine order (newp_1) and in doubled main engine order (newp_2) are shown by way of example in FIG. 15. The amplitudes of the alternating components fluctuate between a minimum (newp_i_Min) and a maximum (newp_i_Max). The curve of an alternating component of this kind is a reference quantity for the phase shift β of the modulation of the activation of the slip arrangement in order to achieve a reduction in rotational irregularity in the corresponding engine order.

There is an optimal amplitude of the active torque Ma, which depends predominantly on the mean engine torque of zeroth order and the mean slip speed. There is an approximately linear relationship between the optimal amplitude and the mean torque in different load states. Amplitudes of modulation of the torque which can be transmitted by the slip arrangement of between 5% and 15% of the mean engine torque are particularly suitable.

Figure 16:
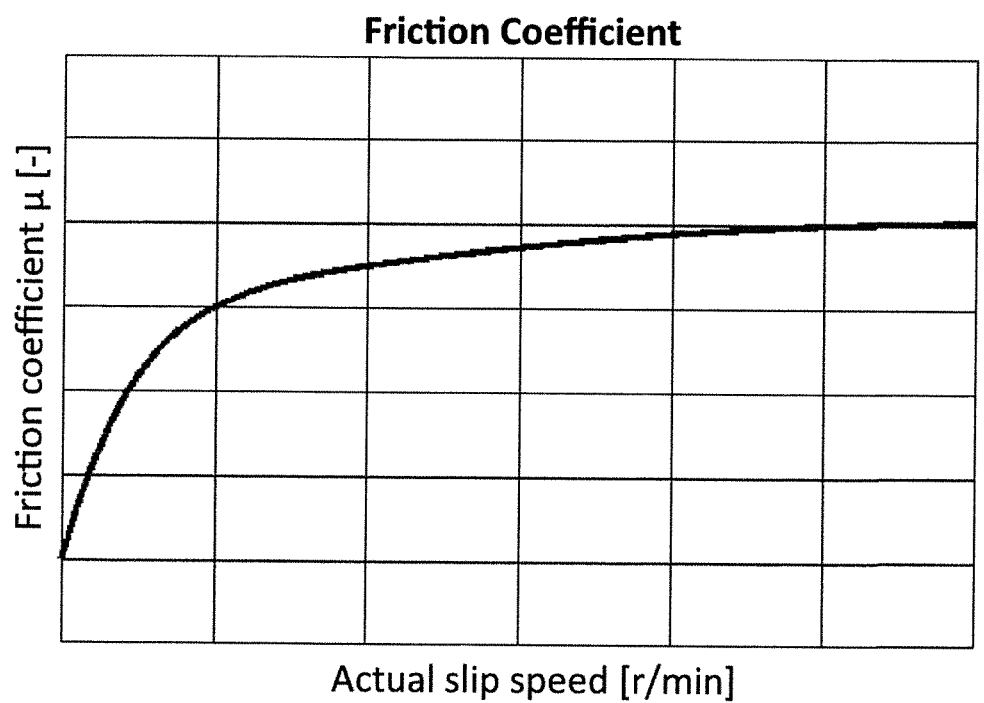
FIG. 16 is a friction coefficient plotted over slip.

The efficiently operative friction coefficient particularly of a wet friction clutch such as is commonly used in motor vehicle powertrains depends on the instantaneous differential speed between the input and the output of the clutch. Usually, the curve is significantly adapted through additives in the oil and through the material and geometry of the linings so as to result in a degressive slope over the slip speed. A typical friction coefficient curve is shown in FIG. 16.

For the slip clutch proposed herein, it is particularly advantageous when the friction coefficient lies in a range of between 0.05 and 0.15 and rises steeply up to a highest possible slip speed. Slopes of the friction coefficient over speed of between 0.001/RPM and 0.005/RPM in a slip range up to 30 RPM are particularly favorable. The mean slip speed is adjusted by a slip controller. Since slip generally causes friction losses which must be dissipated in the form of heat energy, a smallest possible mean slip speed is aimed for. Mean slip speeds of less than or equal to 30 RPM, particularly advantageously less than or equal to 10 RPM, are advantageous for the actively modulated slip.

Active slip mode 2 brings about an appreciable improvement in decoupling compared to the known slip mode 1 primarily in the low to medium speed range. This has the advantage of reduced expenditure in the control and actuation of the slip clutch. Particularly at high speed and depending on the vibration behavior of the powertrain, no slip may be necessary in certain operating states for the decoupling of rotational irregularities. Therefore, it is useful to implement a needs-based operating strategy. This can be based on the following schema:

|  | Low Speed | Medium Speed | High Speed |
| --- | --- | --- | --- |
| High Load | slip mode 2 | slip mode 2 | slip mode 1 |
| Medium Load | slip mode 2 | slip mode 1 | no slip |
| Low Load | slip mode 1 | no slip | no slip |

Particular operating states such as gear-dependent vibrational nodes, starting or resonances are likewise to be taken into account.

Figure 17:
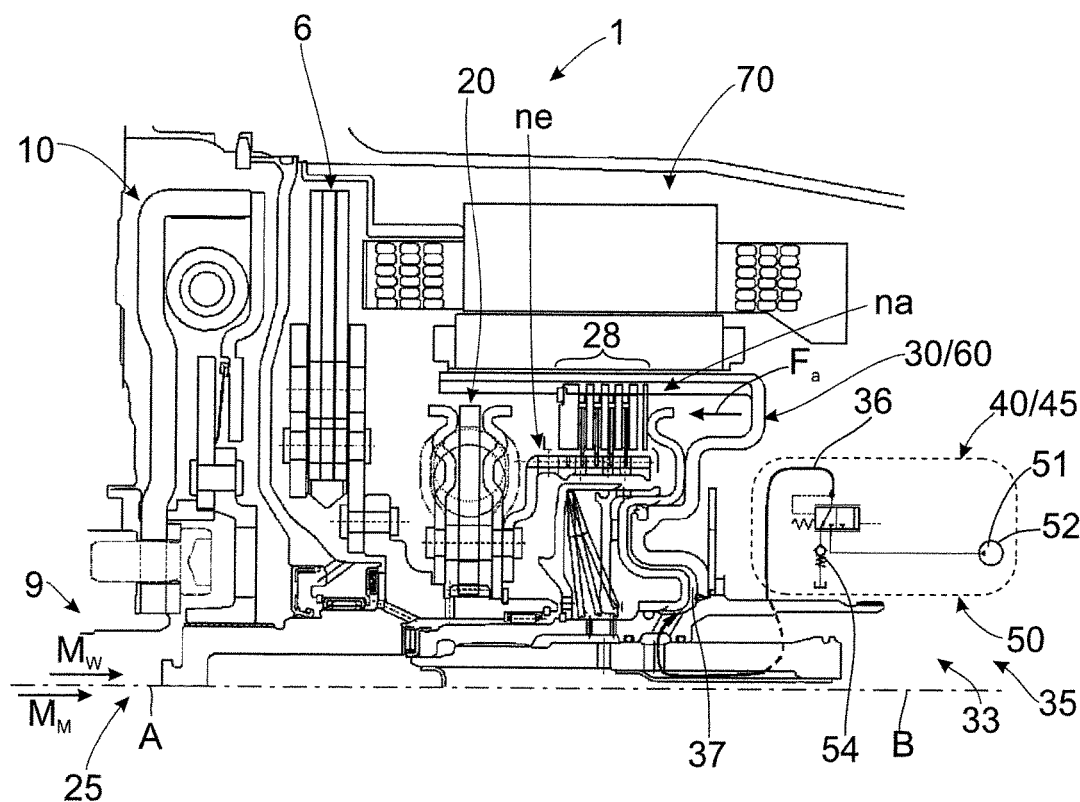
FIG. 17 is a construction of a control, according to the invention, of a slip clutch.

FIG. 17 shows a torque transmission arrangement 1 such as can be used according to the invention in a powertrain of a motor vehicle, for example. A first spring set 10, constructed in this case as a dual mass flywheel, is provided between an input area 25 and an output area 35. A damper unit 6 is installed following the dual mass flywheel 10 along a torque path extending from the input area. A second spring set 20 is provided so as to be fixed with respect to rotation relative to the damper unit 6. The output of the spring set 20 is connected to an input element of the slip arrangement 30 which is constructed in this instance as a multiple disk clutch. The output of the second spring set forms the inner disk carrier of the slip arrangement 30. The outer disk carrier of the slip arrangement 30 is connected to a rotor of an electric drive unit 70 so as to be fixed with respect to rotation relative to it. An external activation 40, 45 of the slip arrangement 30 is shown schematically in FIG. 1. The external activation comprises at least one hydraulic pump 51, a high-pressure storage 52 and a pressure control valve 54. A hydraulic fluid which communicates with a pressure space 27 of the slip arrangement 30 in the direction indicated by the arrow is provided in this instance as transmitting medium. The manner of functioning is as follows: the slip arrangement 30 is acted upon by working pressure by the external activation 40, 45 in order to transmit a mean torque, which is provided by the drive unit at the output area 35 and mainly formed by a gear unit 33. An alternating torque Mw, which is superposed on the mean torque Mm, shall be reduced or, ideally, completely cancelled by the slip arrangement 30. The superposed alternating torque Mw is characterized by at least one maximum of a periodic oscillation newpi_Max and a minimum of a periodic oscillation newpi_Min. For this purpose, the slip arrangement 30 provides the following: a maximum external activation 40 of the speed slip (ns) is provided for a maximum newpi_Max and a minimum external activation 45 of the speed slip (ns) is provided for a minimum newpi_Min. This means that the maximum external activation 40 results in a slip increase at the slip clutch 30, i.e., the input speed ne and the output speed na have a larger delta at the slip clutch 30. Conversely, with a minimum external activation 45, a slip reduction shall be achieved at the slip clutch 30, i.e., the input speed ne and the output speed na have a smaller delta at the slip clutch 30. In the concrete embodiment referring to FIG. 17, this means that the working space 27 is provided with a lower hydraulic pressure during a slip increase so that force Fa acting on a friction assembly 28 of the slip clutch 30 is reduced and, consequently, the transmittable torque of the slip clutch is reduced. However, for a slip reduction at the slip clutch 30 a higher hydraulic pressure is generated in the work space 27 by the external activation 45, which consequently generates a larger pressing force Fa on the friction assembly 28 and allows the slip clutch to transmit greater torque. The activation of the slip clutch 30 is carried out via the external activation 40/45. A sensing, which is required for the control of the external activation and the signals required for this sensing, are chiefly determined via control electronics. The external activation 40/45 is carried out in such a way that a high-frequency slip modulation can be made possible. For example, it may be advantageous when a frequency range of approximately 23 Hz to 50 Hz is achieved for the slip modulation in a three-cylinder combustion engine. In a four-cylinder engine, approximately 33 Hz to 66 Hz can be achieved, and with a six-cylinder engine 50 Hz to 100 Hz can be achieved. In this way, the alternating torques MW which remain after pre-filtering through the dual mass flywheel 10 of the damper unit 6 and the second spring set 20 can advantageously be filtered out. In order to achieve the lowest possible losses in the hydraulic activation 40, 45, it is advantageous to form the hydraulic path from the external activation to the slip clutch 30 as short and, therefore, as stiff as possible.

Figure 18:
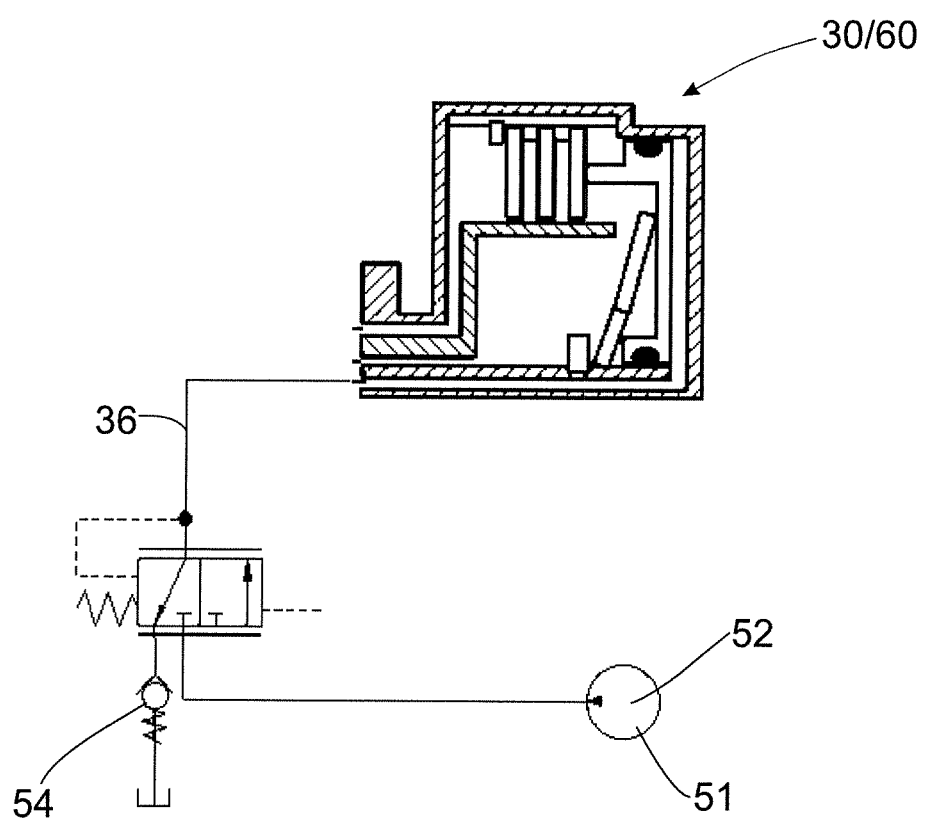
FIG. 18 is a detail of a control of a slip clutch.

FIG. 18 shows the arrangement of the method according to the invention for controlling the slip arrangement 30. Further, the slip arrangement 30 can likewise be used as a starting element 60. In case the slip arrangement 30 is not used as a starting element 60, a specific starting element 60 can be provided as a separate component part in the torque transmission arrangement. In this regard, known starting clutches, for example, a single-disk clutch or dual-disk clutch, a wet multiple disk clutch or a so-called inner starting element, can be used when an automatic planetary gear unit is used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmission and damping of a mean torque (Mm) with a superposed alternating torque (Mw) in a torque transmission arrangement for a powertrain of a motor vehicle having an input area and an output area, the method comprising:
    transmitting the mean torque (Mm) with the superposed alternating torque (Mw) along a torque path (M) from the input area to the output area;
    rotating the input area of the torque transmission arrangement at an input speed (ne) around a rotational axis (A);
    rotating the output area of the torque transmission arrangement at an output speed (na) around a rotational axis (B);
    wherein at least the input speed (ne) is composed of a mean speed (nem) and a superposed alternating component (newp), and an alternating component (new) is defined by a superposition of periodic speed oscillations (newp_i) whose frequencies (f) have a substantially whole number ratio (i) with a firing frequency (Zf);
    wherein each of these periodic oscillations (newp_i) has a minimum (newp_i_Min) and a maximum (newp_i_Max);
    providing a slip arrangement in the torque path (M) between the input area and the output area that transmits the mean torque (Mm) with the superposed alternating torque (Mw) and is configured to generate a speed slip (ns) between the input speed (ne) and the output speed (na) in the torque path (M),
    providing, by the slip arrangement, a maximum of an external activation of the speed slip (ns) in an area of the maxima (newp_i_Max) of at least one periodic oscillation component (newp_i) of the superposed alternating component (newp); and
    providing, by the slip arrangement, a minimum of the external activation of the speed slip (ns) in an area of the minima (newp_i_Min) of the at least one periodic oscillation component (newp_i) of the superposed alternating component (newp).

2. The method according to claim 1, wherein the external activation of the slip arrangement is performed by a hydraulic unit.

3. The method according to claim 2, wherein the hydraulic unit provides at least one hydraulic pump, a hydraulic high-pressure storage, and a pressure control valve.

4. The method according to claim 3, wherein the pressure control valve is spatially associated with the hydraulic high-pressure storage.

5. The method according to claim 3, wherein the pressure control valve is spatially associated with the slip arrangement.

6. The method according to claim 1, wherein the external activation is suitable to provide a modulation range at the slip arrangement of one of:
    from 23 Hz to 50 Hz,
    from 33 Hz to 66 Hz, or
    from 50 Hz to 100 Hz.

7. The method according to claim 1, wherein the slip arrangement is a starting element.

8. The method according to claim 7, wherein the starting element is one of a friction clutch, a multiple disk clutch, a hydrodynamic clutch, a disconnect clutch in a hybrid drive, a dual clutch, a triple clutch, or a brake in conjunction with a planetary gear unit.

9. The method according to claim 1, wherein a starting element is provided in addition to the slip arrangement.

10. The method according to claim 9, wherein the slip arrangement is one of a friction clutch, a multiple disk clutch, a hydrodynamic clutch, a disconnect clutch in a hybrid drive, a dual clutch, a triple clutch, or a brake in conjunction with a planetary gear unit.

11. The method according to claim 1, wherein rotational axis (A) and rotational axis (B) one of:
   extend coaxially,
   extend so as to be offset relative to one another.

* * * * *